324-077. OR 3566264 SR

Feb. 23, 1971     B. F. CHOWN     3,566,264
METHOD AND APPARATUS FOR ANALYSING ELECTRICAL
SIGNALS WITH DIGITAL CORRELATION
Filed July 3, 1967     2 Sheets-Sheet 1

INVENTOR
Bruce F. Chown
BY Weir, Marshall,
MacRae, & Lamb.
PATENT AGENT

United States Patent Office 3,566,264
Patented Feb. 23, 1971

3,566,264
METHOD AND APPARATUS FOR ANALYSING ELECTRICAL SIGNALS WITH DIGITAL CORRELATION
Bruce F. Chown, Ottawa, Ontario, Canada, assignor to Computing Devices of Canada Limited, Ottawa, Ontario, Canada
Filed July 3, 1967, Ser. No. 651,033
Int. Cl. G01r 23/16
U.S. Cl. 324—77                                    10 Claims

ABSTRACT OF THE DISCLOSURE

A spectrum analyser using digital correlation techniques where a large number of oscillators are simulated by using digital registers such as magnetic core storage registers. A periodically varying characteristic of each digital register, such as the value of its most significant digit, defines the corresponding oscillator phase. An unknown signal is sampled and limited and its polarity expressed as a single bit. Repeated samplings give a binary sequence and individual bits are compared with bits of the binary sequences representing the oscillator frequencies. Any coincidences between the binary sequences are detected and summed to give a statistical measure of the correlations between the unknown signal and the oscillator frequencies. The analyser is capable of measuring the relative phase of components of the unknown signal and of tracking slowly varying signal components.

BACKGROUND OF THE INVENTION

This invention is directed to an analyser for determining the frequency-energy distribution of an unknown signal particularly when in a noisy environment. The necessity for identifying the frequency-energy distribution, hereafter termed the frequency spectrum, of an unknown signal often arises in signal processing applications. Spectrum analysers are known which use a single, highly selective, band-pass filter. The unknown signal is heterodyned with the output of a variable frequency oscillator and applied to the filter. The frequency components of the unknown signal are represented by the filter output as the oscillator sweeps across the frequency band. A second type of known analyser uses a plurality of band-pass filters having their center frequencies arranged to cover the frequency range of interest. Such known analysers fail to give useful results when the signal is mixed with a high level of noise and, further, are not sensitive to the phase of components of the unknown signal as is the spectrum analyser of this invention.

SUMMARY OF THE INVENTION

Briefly, this invention contemplates the provision of a large number of separate oscillators whose frequencies are compared with the unknown signal. The correlation between the unknown signal and the oscillator outputs is computed separately for each oscillator. The degree of correlation thus obtained constitutes a measure of the amplitude of the corresponding frequency component in the unknown signal. It is an essential feature of this invention that the signal processing is performed digitally. That is, the oscillators are formed by digital registers which are incremented at a fixed rate, each by a different amount. Since each register overflows, its count is, of course, an oscillatory quantity and a binary sequence can be obtained from each register to represent the constant frequency output of an oscillator. A register operating in this manner will be described as a recycling register. The unknown signal is sampled and its polarity expressed as a single bit. This sampling is repeated at a rate related to the rate of incrementing the digital oscillators and a further binary sequence representing the polarity of the unknown signal is thus produced. Individual bits of this latter sequence are then compared periodically with corresponding bits of each oscillator binary sequence and the number of coincidences summed to provide a measure of the correlation between the unknown signal and each oscillator frequency. In general, the periodicity of the unknown signal binary sequence will be different from, though related to, the periodicity of the various oscillator binary sequences.

In this specification a digital register, incremented at a constant rate as described above, will be denoted by the term "digital oscillator." Any periodic binary sequence from such a digital oscillator having a mark-space ratio of approximately unity may be used. For example, the value of the most significant digit in the register produces a suitable binary sequence. Such a sequence may be said to represent the polarity of the digital oscillator.

DESCRIPTION OF PREFERRED EMBODIMENT

Figure 1:
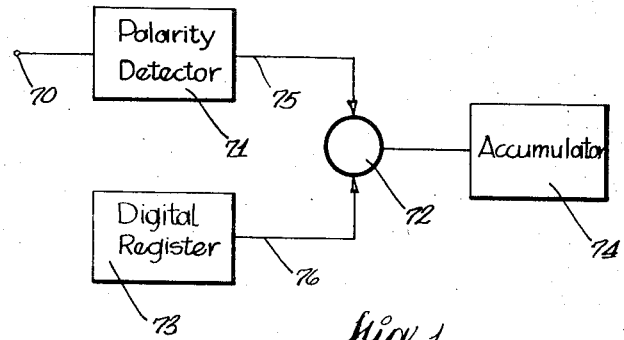
FIG. 1 is a block diagram useful in illustrating the principles of this invention.

In FIG. 1 there is shown a polarity detector 71 having an input terminal 70 for connection to the unknown signal to be analysed. The output of polarity detector 71 appearing on a conductor 75 is connected to one input of a comparator 72. A digital register 73 is provided which is being incremented at a constant rate. The most significant digit of register 73 appears on a conductor 76 which is connected to another input of comparator 72. The output of comparator 72 is connected to an accumulator 74.

The output of polarity detector 71, appearing on conductor 75, is a binary sequence representing the polarity of the unknown signal at fixed instants. That is, this polarity is sampled at a constant rate. Thus, the binary sequence appearing on conductor 75 has a periodicity determined by the sampling rate. It will be noted that the periodicity of this binary sequence is independent of the periodicity of the unknown signal applied to input terminal 70. The output of register 73, appearing on conductor 76, is a further binary sequence, shown diagrammatically in FIG. 2A, having a period which is a rational multiple of the sampling period. That is, the most significant digit of register 73 follows a pattern of a certain time spent at position 0 and then an essentially equal time spent at position 1 and in this sense defines a frequency given by the periodicity of the binary pattern. Accordingly, the recycling register 73 may be said to function as a digital oscillator. For the most efficient operation of the analyser it is necessary that the binary sequence have a mark-space ratio of approximately unity.

Comparator 72 functions to compare the binary sequence representing input signal polarity, appearing on conductor 75, with the binary sequence from the digital oscillator. When there is coincidence between the corresponding binary digit in each sequence a pulse appears at the output of the comparator. These pulses are summed by accumulator 74. As has been mentioned the two binary sequences being compared have a different periodicity. For example, referring to FIG. 2A, several bits of the binary sequence representing the polarity of the unknown signal will occur in the interval $0-T_{1/2}$, while one-half cycle of the oscillator sequence occurs in this period.

The maximum sum possible in accumulator 74 is equal to the number of sampled polarity pulses appearing on conductor 75. This maximum sum is achieved when there is complete positive correlation between the sampled polarity pulses and the output of the digital oscillator. Consider the case of exact correspondence in frequency and phase between the fundamental component of the unknown signal and the output of the digital oscillator. During the time interval when the digital oscillator signal on conductor 76 represents binary 1, the input signal at terminal 70 has a positive polarity resulting in a series of pulses on conductor 75 representing binary 1; this series of pulses occurs at the sampling rate. Since both signals supplied to comparator 72 represent binary 1, the comparator supplies an output signal consisting of a series of pulses at the sampling rate. In a similar fashion, when the digital oscillator signal on conductor 76 represents binary 0, the input signal has a negative polarity and a series of pulses representing binary 0 and occurring at the sampling rate appears on conductor 75. Again, both signals applied to comparator 72 are identical, representing binary 0, and the comparator output is a series of pulses at the sampling rate. Thus a sum of M is obtained in the accumulator 74 where M is the total number of sampling pulses in the interval considered. Similarly, a sum of zero is obtained when there is complete negative correlation. If the unknown signal and the digital oscillator are uncorrelated then random coincidences will produce an accumulator sum approaching $M/2$ where M is the total number of sampled polarity pulses occurring in the time interval considered. Thus, to express the result in terms of conventional correlation coefficients, which extend from $+1$ for perfect positive correlation through zero for no correlation to $-1$ for perfect negative correlation, the function $$2/M\left(C-\frac{M}{2}\right)$$

is evaluated, where C is the accumulator count.

Figure 2:
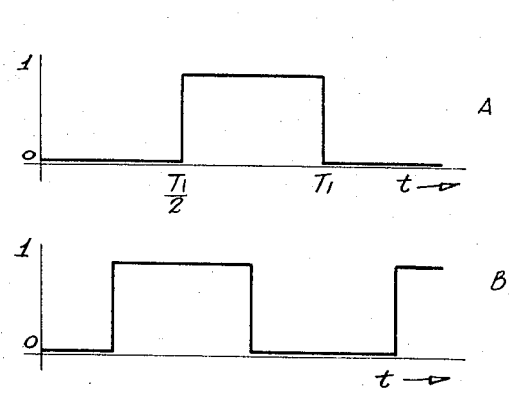
FIG. 2 is a graphical representation of two binary sequences obtainable from the digital register of FIG. 1.

If a frequency component of the unknown signal is in time quadrature with the frequency represented by the binary sequence of FIG. 2A then no correlation will be be detected by the apparatus of FIG. 1. In order to ensure such frequency components are detected, it is necessary to supply a further digital oscillator, comparator and accumulator unit, with the digital oscillator functioning in the phase relationship shown in FIG. 2B. This does not require the provision of a further register 73 since the binary sequence of FIG. 2B may be obtained from the two most significant binary digits, $B_1$ and $B_2$, of register 73 by forming the function F where:

$$F = \overline{B}_1.\overline{B}_2 + \overline{B}_1.B_2$$

Thus to detect the presence of a particular frequency component in the unknown signal and determine its phase, one register, two comparators and two accumulators are required. To determine the complete spectral information regarding an unknown signal several hundred such digital oscillators with their associated comparators and accumulators are required. In terms of continuous wave oscillators such a requirement would be prohibitive, even considering only the frequency stability required.

By the use of digital signal processing, however, the realization of an analyser using several hundred such digital oscillators becomes practicable. Such an analyser may consist of digital apparatus designed specifically for the task or, instead, a general purpose data processor may be programmed to operate as the analyser of this invention.

Figure 3:
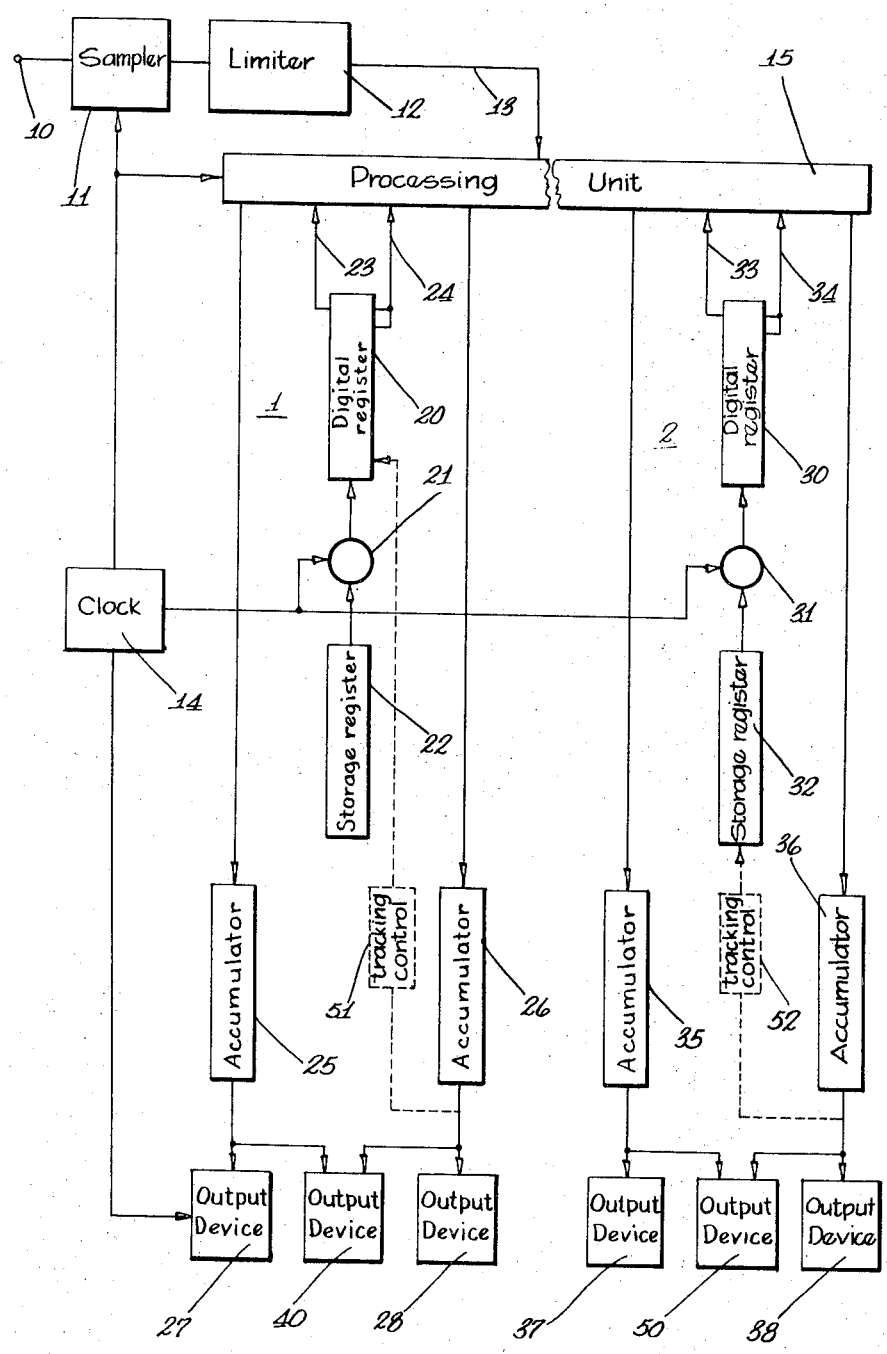
FIG. 3 is a block diagram of a digital spectrum analyser illustrating the principles of this invention.

Considering first, apparatus designed specifically for the task one embodiment of such an analyser is shown in block diagram from in FIG. 3. Referring to this figure, there is shown a sampler 11 having an input terminal 10 adapted to be connected to a source of signal to be analysed. The output of sampler 11 is connected to a limiter 12 which hard-limits the sampled signal so that a binary sequence appears on output conductor 13 representing the polarity of the sampled signal.

A plurality of digital registers are provided, of which two are shown at 20 and 30. Each such register has a corresponding storage register 22 and 32 forming a pair of digital oscillators indicated generally at 1 and 2. Storage registers 22 and 32 are connected to the corresponding recycling register by transmission gates 21 and 31 respectively. Register 20 has two outputs appearing on conductors 23 and 24 giving two binary sequences in time quadrature with one another as previously discussed in connection with FIGS. 2A and 2B. Similarly, register 30 has two outputs appearing on conductors 33 and 34 also giving quadrature binary sequences. As previously stated in connection with digital register 73 in FIG. 1, registers 20 and 30 may be described as recycling registers in that their total count is increased at the occurrence of each clock pulse by adding in an increment corresponding to the count stored in registers 22 and 32. When the count pasess the total capacity of each register, it returns to zero and recycles in this fashion.

A clock or timing source for the analyser is provided at 14 which controls gates 21 and 31 and hence the rate at which the increments stored in registers 22 and 32 are added to the count in registers 20 and 30, respectively. The frequency of the signals appearing on conductors 23, 24, 33 and 34 is dependent both on the frequency of clock source 14 and the magnitude of the number increment stored in registers 22 and 32. The relative spacing of the frequencies generated by the digital oscillators is, however, independent of the clock source and dependent only on the number increments stored in registers 22 and 32. Clock source 14 is also connected to control a processing unit 15 which performs the function of comparing the binary digit represented by the output of each digital oscillator with the binary digit represented by the output of limiter 12 after each recycling register has been incremented from its respective storage register. Finally, clock source 14 is connected to sampler 11 to control the rate of sampling of the input signal. The sampling rate is controlled to give two samples per cycle for the highest frequency to be monitored. That is, the sampling rate is two samples per cycle for the highest digital oscillator frequency employed. Since the processing unit deals with each oscillator output in sequence the computation must be completed for all oscillators in the time available between consecutive sample pulses.

Accumulators 25, 26, 35 and 36 are provided, each giving a sum representative of the coincidences between the individual bits of the binary sequence on conductor 13 and the correspondingly occurring bit at the output of the respective digital oscillator. Output devices 27, 28, 37 and 38 are provided connected to accumulators 25, 26, 35 and 36 respectively. The output devices display the count in the related accumulator or such function of it as may be required. For example, the accumulator count may be altered in the output device, as set out above, by subtracting half the total counts to give an indication of whether the correlation is positive or negative. The output device may further modify the accumulator count by the factor $2/M$, again as set out above, to give the correlation coefficient directly. For these purposes a further connection is necessary from clock source 14 to the output devices, as is shown to output device 27.

Similarly an output device 50 is provided having a pair of inputs connected one each to the outputs of accumulators 35 and 36. Output device 50 squares and sums the corrected counts of accumulators 35 and 36 to provide a measure of the signal power in a narrow band around the frequency of digital oscillator 2.

The phase angle $\phi$ between a signal component and the related digital oscillator may be obtained from the relationship $$\phi = \text{Arc tan} \frac{\Sigma_{90}}{\Sigma_0}$$

where $\Sigma_{90}$ is the adjusted count in the quadrature oscillator $\Sigma_0$ is the adjusted count in the in-phase oscillator. Thus, if desired, further output devices can be provided to compute the phase angle $\phi$ for each component of the input signal.

The analyser of this invention may be used to detect a low level signal in the presence of noise. In such a case the output device for the channel nearest in frequency to the low level signal will indicate the presence of the signal. The utility of the analyser may be greatly enhanced by enabling it to track the signal when it varies slowly in frequency or phase. The analyser of this invention can meet this requirement by means of a relatively simple modification. This involves controlling the digital oscillator so that the corrected count in the quadrature accumulator is maintained at zero.

Two alternative, but not mutually exclusive, connections for tracking control are shown in FIG. 3. In the first connection a tracking control unit 51 is connected between accumulator 26 and register 20. Tracking control unit 51 functions to maintain the count in quadrature accumulator 26 approximately at zero. In other words, unit 51 forces digital oscillator 1 to run in phase synchronism with the corresponding frequency component of the unknown signal. This is achieved by periodically inspecting the corrected count in quadrature accumulator 26 (i.e. $(C-M/2)$ above) and, when a deviation from zero is detected, making a correction to the count in register 20 to bring its output on conductor 23 into synchronism with the corresponding frequency component of the unknown signal. That is, if the quadrature detector shows that the signal on conductor 23 is phase advanced with respect to the component of the unknown signal then the count in register 20 is diminished by control 51. Alternatively, if the signal on conductor 23 is phase lagging with respect to the component of the unknown signal, an increment is added to the count in register 20.

The action of control unit 51 may be viewed as conventional proportional control in that when the phase of the digital oscillator 1 differs from that of the unknown signal component the phase is corrected to reduce this difference. The periodic inspection of the count in the quadrature accumulator is not at the same rate as the sampling rate of the system controlled by clock source 14 and, typically, will be a much slower rate depending on the expected rate of drift of the unknown signal. Control over the gain of the feedback system including tracking control 51 may be achieved by varying the stage of register 20 to which the correction is added. That is, for low values of gain the correction would be added to the least significant digit in register 20 while, for higher values of gain the correction would be added to a more significant digit.

In the second connection for tracking control, a control unit 52 is connected between quadrature accumulator 36 and storage register 32. In a similar fashion to the operation of unit 51, unit 52 maintains the count in accumulator 36 approximately at zero and thus forces the digital oscillator to run in phase synchronism with the corresponding frequency component of the unknown signal. The corrected count of accumulator 36 is periodically inspected and, when a deviation from zero is detected, a correction is applied to storage register 32. This correction is of the appropriate polarity to reduce the corrected quadrature accumulator count towards zero. By altering the count in storage register 32 the frequency of digital oscillator 2 is varied. By reading the count in register 32, the frequency of the signal being tracked may be found.

The action of control unit 52 may be viewed as similar to conventional integral control in that, when the phase of digital oscillator 2, i.e. the integral of the frequency, varies from that of the unknown signal component, the frequency is corrected to reduce this variation. As with tracking control unit 51, the periodic inspection of the quadrature accumulator count is at a much slower rate than the sampling rate of the system and depends on the expected rate of drift of the unknown signal. Control over the gain of the system including tracking control 52 may be achieved by varying the position in storage register 32 to which the correction is added. It will be appreciated that this variation may proceed while the analyzer is operating. That is, it is possible for the control to adapt to different signal stabilities.

As has been mentioned, the embodiment of the invention shown in FIG. 3 may be viewed from two aspects. In its first aspect, as described above, it represents digital apparatus arranged to form the digital spectrum analyser. In its second aspect, it may be regarded as a diagram indicative of the programming of a general purpose data processor to function as a digital spectrum analyser.

In this, second, aspect a word in the processor core memory may be used for each digital register 20, 30 etc., and a further word used for each storage register 22, 32 etc. Thus, two words of core storage are used for each digital oscillator. That is, for each digital oscillator there is a location in memory designated $\theta$ and a location designated $\Delta$ and the processor program includes the sequence $$\Delta + \theta \rightarrow \theta$$

For each oscillator there are also two locations in the memory designated $R_0$ and $R_{90}$ which correspond to accumulators 25 and 26. Each time the 0 count is incremented the two cross-correlation increments $\delta R_0$ and $\delta R_{90}$ are computed. These are then stored according to the rules:

$$R_0 + \delta R_0 \rightarrow R_0$$
$$R_{90} + \delta R_{90} \rightarrow R_{90}$$

The operation of tracking control 51, described above may then be achieved by the operations:

$$\theta + KR_{90} \rightarrow \theta$$
$$0 \text{ (zero)} \rightarrow R_{90}$$

where K sets the gain of the loop.

Similarly the operation of tracking control 52 is achieved by the operations:

$$\Delta + KR_{90} \rightarrow \Delta$$
$$0 \text{ (zero)} \rightarrow R_{90}$$

I claim:
1. A signal analyser comprising,
    sampling means responsive to an unknown signal to produce a first binary sequence indicative of its polarity,
    a plurality of digital oscillators each yielding a periodic binary sequence, having a mark-space ratio of approximately unity, defining a pre-assigned frequency for each oscillator, said frequency being different for each oscillator,
    digital processing means connected to said sampling means and to said digital oscillators to provide a set of signals, each such signal being indicative of coincidence between a digit of said first binary sequence and a corresponding digit of one of said periodic binary sequences, and
    summing means connected to said digital processing means separately to sum the signals of each said set of signals each said sum indicating the correlation between said unknown signal and a respective digital oscillator frequency.

2. A signal analyser comprising:
    a sampling and limiting circuit adapted to be connected to a first signal to produce a sequence of sample pulses having a polarity indicative of the polarity of said first signal;

a plurality of storage registers;

a corresponding plurality of digital registers;

adding means to add the number in each storage register to the corresponding digital register, the numbers in said storage registers being different so that said digital registers overflow at different rates each producing a pair of periodic binary sequences, having a mark-space ratio of approximately unity, defining a pre-assigned frequency for each oscillator, the sequences in each pair being in quadrature with one another;

a timing source connected to said sampling circuit and said adding means to synchronize their operation;

digital processing means connected to said limiting circuit and to said digital registers to produce a series of second signals indicative of coincidence between the polarity of said sample pulses and corresponding digits of each one of said binary sequences, a plurality of accumulators comprising a pair for each digital register connected to said digital processing means and responsive to said series of second signals to sum separately the coincidences for each said binary sequence, said accumulator sums indicating the correlation, with respect to frequency and phase, between said first signal and said digital oscillator frequencies.

3. A signal analyser as defined in claim 2 further comprising means responsive to the count in at least one of said accumulators for modifying the count in the corresponding digital register.

4. A signal analyser as defined in claim 2 further comprising means responsive to the count in at least one of said accumulators for modifying the count in the corresponding storage register.

5. A signal analyser as defined in claim 2 further comprising an output device for each accumulator, said output device producing a modified count $$2/M \left( C - \frac{M}{2} \right)$$

where C is the count in the accumulator and M is the number of pulses in said sequence of sample pulses.

6. A signal analyser as defined in claim 2 further comprising means responsive to the count in at least one of said accumulators for modifying the counts in the corresponding digital and storage registers.

7. A method for determining the frequency components of an unknown signal, using a digital processor, comprising the steps of:

storing preselected increments of differing amounts in a first series of positions in said digital processor memory, periodically adding the contents of each position of said first series of memory positions to a corresponding one of a second series of memory positions, and extracting a preselected function of the most significant digits in said second series of memory positions to provide a series of binary sequences whose periodicities are substantially uniformly spaced in said frequency band, periodically sampling and limiting said signal to produce a binary sequence indicative of its polarity, comparing said polarity indicative binary sequence with each of said series of binary sequences to establish the occurrence of coincidences, and adding increments representative of said coincidences to respective ones of a third series of memory positions in said processor, the magnitude of the counts in said third series of memory positions being indicative of the presence of signal components at a frequency corresponding to the periodicity of the corresponding binary sequence.

8. A method for detecting and tracking a frequency component of an unknown signal comprising the steps set out in claim 7 and further comprising:

periodically detecting the count in at least one of said third series of memory positions, and adding an increment to a corresponding one of said second series of memory positions so as to reduce said detected count towards zero.

9. A method for detecting and tracking a frequency component of an unknown signal comprising the steps set out in claim 7 and further comprising periodically detecting the count in at least one of said third series of memory positions, and adding an increment to a corresponding one of said first series of memory positions so as to reduce said detected count towards zero.

10. A method for detecting and tracking a frequency component of an unknown signal comprising the steps set out in claim 7 and further comprising:

periodically detecting the count in at least one of said third series of memory positions, and adding an increment to a corresponding one of said first and second series of memory positions so as to reduce said detected count towards zero.

References Cited

UNITED STATES PATENTS

| | | | |
|---|---|---|---|
| 3,045,180 | 7/1962 | Losher | 324—77(G) |
| 3,206,684 | 9/1965 | Der et al. | 328—110 |
| 3,209,250 | 9/1965 | Burns et al. | 324—77(G) |
| 3,277,695 | 10/1966 | Joline | 324—77(G)X |
| 3,307,184 | 2/1967 | Poterack et al. | 324—77(G)UX |
| 3,344,349 | 9/1967 | Schroeder | 324—77(H) |
| 3,376,411 | 4/1968 | Montani et al. | 324—77(G)X |
| 3,407,289 | 10/1968 | Williams | 324—77(G)X |

OTHER REFERENCES

IBM Technical Disclosure Bulletin, vol. 4, No. 7, p. 51, December 1961.

EDWARD F. KUBASIEWICZ, Primary Examiner